United States Patent
Booij et al.

(10) Patent No.: US 9,261,581 B2
(45) Date of Patent: Feb. 16, 2016

(54) LOCATION SYSTEM

(71) Applicant: Sonitor Technologies AS, Oslo (NO)

(72) Inventors: Wilfred Edwin Booij, Nordby (NO); Oystein Haug Olsen, Asker (NO)

(73) Assignee: Sonitor Technologies AS, Oslo (NO)

( * ) Notice: Subject to any disclaimer, the term of this patent is extended or adjusted under 35 U.S.C. 154(b) by 0 days.

(21) Appl. No.: 14/721,712

(22) Filed: May 26, 2015

(65) Prior Publication Data

US 2015/0253413 A1 Sep. 10, 2015

Related U.S. Application Data

(63) Continuation of application No. 14/110,376, filed as application No. PCT/GB2012/050781 on Apr. 5, 2012, now Pat. No. 9,069,058.

(30) Foreign Application Priority Data

Apr. 7, 2011 (GB) .................................. 1105902.9

(51) Int. Cl.
*G01S 1/00* (2006.01)
*G01S 5/18* (2006.01)
*G01S 1/72* (2006.01)
*G01S 1/74* (2006.01)
(Continued)

(52) U.S. Cl.
CPC . *G01S 5/18* (2013.01); *G01S 1/725* (2013.01); *G01S 1/74* (2013.01); *G01S 1/805* (2013.01); *G01S 1/807* (2013.01); *G01S 5/26* (2013.01); *G01S 5/30* (2013.01); *H04L 27/18* (2013.01)

(58) Field of Classification Search
CPC ......... G01S 1/805; G01S 1/807; G01S 1/725; G01S 1/74; G01S 5/26; G01S 5/30; H04L 27/18

See application file for complete search history.

(56) References Cited

U.S. PATENT DOCUMENTS 5,029,147 A 7/1991 Andrews et al.
6,469,656 B1 * 10/2002 Wagner .................. G01S 13/34
342/104

(Continued)

FOREIGN PATENT DOCUMENTS

WO 2004027444 4/2004

OTHER PUBLICATIONS

Perez et al. "Ultrasonic Beacon-Based Local Positioning System Using Loosely Synchronous Codes", Intelligent Signal Processing, 2007, Oct. 3, 2007, pp. 1-6.

(Continued)

*Primary Examiner* — Luke Ratcliffe
*Assistant Examiner* — Hovhannes Baghdasaryan
(74) *Attorney, Agent, or Firm* — O'Shea Getz P.C.

(57) ABSTRACT

Static transmitter stations are used to determine the position of a mobile receiver unit. Each transmitter station transmits an ultrasonic signal including a transmitter-specific phase-shifting signature. The receiver unit receives a signal and identifies a transmitter station by its signature. It uses the received signal and the identity of the source transmitter station to determine the position of the mobile receiver unit. The signature may include two patterns phase-shift-key (PSK)-encoded on respective carrier signals of the same frequency but different phase, with the patterns being offset from each other by a transmitter-specific offset. The signal from the transmitter station may also include a PSK-encoded message.

12 Claims, 2 Drawing Sheets

(51) Int. Cl.
  *G01S 1/80*  (2006.01)
  *G01S 5/26*  (2006.01)
  *G01S 5/30*  (2006.01)
  *H04L 27/18* (2006.01)

(56) References Cited

U.S. PATENT DOCUMENTS

| | | | |
|---|---|---|---|
| 7,030,811 B2 | 4/2006 | Goren et al. | |
| 7,430,257 B1 | 9/2008 | Shattil | |
| 8,044,839 B2 * | 10/2011 | Sutphin | G01S 7/006 340/541 |
| 8,305,842 B2 | 11/2012 | Holdsworth | |
| 8,704,702 B2 * | 4/2014 | van Dorp | G01S 7/415 342/104 |
| 2003/0142587 A1 | 7/2003 | Zeitzew | |
| 2004/0071200 A1 | 4/2004 | Betz et al. | |
| 2005/0232081 A1 | 10/2005 | Holm | |
| 2006/0250294 A1 * | 11/2006 | Zemany | G01S 13/003 342/22 |
| 2007/0133711 A1 | 6/2007 | Li | |
| 2007/0211786 A1 | 9/2007 | Shattil | |
| 2009/0067514 A1 * | 3/2009 | Stojanovic | H04L 27/2657 375/260 |
| 2009/0149202 A1 | 6/2009 | Hill et al. | |
| 2011/0090762 A1 | 4/2011 | Rhodes et al. | |

OTHER PUBLICATIONS

Jiminez et al. "FPGA-Based Implementation of an Ultrasonic Beacon for a Local Positioning System", IEEE Industrial Electronics, Nov. 1, 2006, pp. 4945-4950.

* cited by examiner

LOCATION SYSTEM

This application is a continuation of U.S. patent application Ser. No. 14/110,376 filed Feb. 12, 2014, which is entitled to the benefit of, and incorporates by reference essential subject matter disclosed in PCT Application No. PCT/GB2012/050781 filed on Apr. 5, 2012, which claims priority to GB1105902.9 filed Apr. 7, 2011.

BACKGROUND OF THE INVENTION

1. Technical Field

This invention relates to systems and methods for determining the position of a mobile unit using ultrasound.

2. Background Information

There are many situations in which it is desirable to be able to determine the location of a moveable object, such as a person or an item of equipment, within an area such as a hospital ward.

It is known to provide a network of static base stations, e.g. attached to ceilings or walls, and to attach ultrasonic tags to moveable objects which communicate with one or more of the base stations so as to allow the location of the tagged object to be determined. Ultrasound is well suited to this purpose as it is undetectable to humans. It also travels much more slowly than radio waves, and attenuates more rapidly, so is much easier to process for determining the typical relatively short distances between transmitter and receiver.

US 2005/0232081 describes a system for indoor acoustic positioning in which an identification tag transmits a spread spectrum sequence unique to that tag. A detector unit receives the sequence and compares it against all the sequences in use in the system in order to identify the tag. The position of the tag can be determined based on differences in arrival times of the sequence at different detector units.

Such an approach has limitations. In particular, its accuracy in determining the identity and position of the tag can be adversely affected by multi-path interference, which is commonly present due to reflections of the transmitted signal from walls, ceilings and other surfaces. It can also fail to recognize a tag which is moving and thereby creating a Doppler shift in the received signals. It is also limited to having a fairly small number of tags, since an increase in the number of tags in the system as a whole requires an increase in the lengths of the sequences to ensure that sufficient are available, which can increase computational requirements. Moreover, in order to maintain reasonable update rates, multiple tags must transmit simultaneously, which is likely to lead to recognition errors.

The present invention seeks to address these shortcomings.

SUMMARY OF THE DISCLOSURE

From a first aspect, the invention provides a system for determining the position of a mobile receiver unit comprising: a plurality of static transmitter stations each configured to transmit an ultrasonic signal comprising a phase-shifting signature specific to the static transmitter station; a mobile receiver unit configured to receive an ultrasonic signal from one of the transmitter stations; processing means configured to use the received signature to identify the source transmitter station; and processing means configured to use the received signal and the identity of the source transmitter station to determine information relating to the position of the mobile receiver unit.

From another aspect, the invention provides a method of determining the position of a mobile receiver unit comprising: transmitting a respective ultrasonic signal from each of a plurality of static transmitter stations, each signal comprising a phase-shifting signature specific to the static transmitter station; receiving an ultrasonic signal from one of the transmitter stations at a mobile receiver unit; using the received signature to identify the source transmitter station; and using the received signal and the identity of the source transmitter station to determine information relating to the position of the mobile receiver unit.

From a further aspect, the invention provides a static transmitter station configured to transmit an ultrasonic signal comprising a phase-shifting signature specific to the static transmitter station.

Thus it will be seen by those skilled in the art that, in accordance with the invention, signals are transmitted by the static stations to a mobile unit. The applicant has realized that, in many contexts, such as hospitals, the number of movable objects (people, equipment, etc.) in an area may often be greater than the number of static stations required to provide coverage of the same area. By transmitting from the static stations, the number of mobile units can increase indefinitely without requiring more complex signals and without affecting the accuracy of the system.

Moreover, by transmitting a phase-shifting signature as part of the signal, the mobile receiver unit is able to distinguish reliably between overlapping signals from multiple transmitter stations and to cope with motion-induced phase shifts and multi-path interference, as explained in more detail below.

Preferably each signature comprises a predetermined pattern which is a phase-shift-key (PSK)-encoded sequence or code; for example, a PSK-encoded predetermined Barker code.

Preferably each signature comprises a PSK-encoded Barker code of length 11 or 13. Preferably each signature comprises one, two or more instances of PSK-encoded Barker codes, in a predetermined temporal and/or phase relationship to one another. This relationship is preferably specific to each transmitter. The relationship may therefore be used by the receiver to identify a particular transmitter.

Preferably each signature comprises a first PSK-encoded pattern, and a second PSK-encoded pattern, wherein the second pattern is offset in phase from the second pattern. It may conveniently be offset by 90 degrees, although other offsets are possible. Both patterns may be quadrature PSK (QPSK)-encoded. The transmitter may be configured to encode the first pattern on a first carrier using binary-phase-shift-key (BPSK) encoding, and to BPSK-encode the second pattern on a second carrier, wherein the first and second carriers are at the same frequency, and wherein the second carrier is out of phase with the first carrier. In preferred embodiments, the first carrier is 90 degrees out of phase with the second carrier. While the use of higher-order PSK encodings such as 6-PSK or 8-PSK is not excluded, QPSK is currently preferred because it permits relatively simple correlation operations, as described in more detail below. The first carrier may be a sine wave, and the second carrier may be a cosine wave, or vice versa.

A Barker code is one of a set of well-known strings of bit values (represented as +1 or −1) that have strong auto-correlation at zero offset and low auto-correlation (no greater than 1) at all non-zero offsets. Barker codes of lengths 2, 3, 4, 5, 7, 11 and 13 bits are known.

The first pattern may be a Barker code. The second pattern may be a Barker code. The second pattern is preferably the same as the first pattern, except for their relative phases; this can simplify decoding.

Preferably the beginning of the second pattern is offset in time from the beginning of the first pattern by a predetermined offset. Preferably this offset is less than the length of the first pattern, so that the two patterns overlap in time.

By transmitting a signature comprising overlapping patterns (at different phases), the length of time between the start of the first pattern and the end of the second pattern is reduced compared with consecutive (non-overlapping) transmission, and therefore the likelihood of a motion-induced phase change occurring within this time period is reduced, making the signature particularly robust against the effects of relative movement between transmitter and receiver. The strongly peaked auto-correlation property of Barker codes enables the overlapping patterns to be distinguished in a received signature, even in an asynchronous system.

Preferably the temporal offset is specific to each transmitter. Being specific to a transmitter may mean being unique to that transmitter across the whole system, or it may mean being unique amongst a subset of transmitters, e.g. a subset having overlapping transmission ranges.

Preferably a single, common pattern appears in the signature of every transmitter. This can simplify the decoding process. This pattern is preferably a Barker code. An 11 or 13-bit Barker code is preferred over a shorter code as it has increased signal-to-noise ratio. Codes longer than 13 bits are less preferred (unless they are hitherto-undiscovered Barker codes) since their auto-correlation properties are not as optimal. Nonetheless, the pattern may comprise a relatively short code that is not a Barker code. In this case it is desirable that the code be relatively short, e.g. less than 16 bits. It is desirable that the code have low autocorrelation at non-zero offsets (e.g. autocorrelation values always less than 2 or 3).

When a 13-bit Barker code is used, in some embodiments it can be possible to support up to around five different transmitters having different transmitter-specific offsets. It is possible to support far more transmitters than this if the signature comprises additional Barker codes at different offsets, albeit at the cost of a longer signature and therefore some reduction in bandwidth.

The mobile unit may comprise some or all of the processing means. This may have some advantages since the signals are received at the mobile unit, and so do not then need to be relayed elsewhere for processing.

Thus from a further aspect, the invention provides a mobile receiver unit configured to receive an ultrasonic signal comprising a phase-shifting signature from a transmitter station, wherein the mobile receiver unit comprises processing means configured to use the received signature to identify the source transmitter station, or comprises processing means configured to use the received signal and the identity of the source transmitter station to determine information relating to the position of the mobile receiver unit.

In some embodiments one or more of the static stations may comprise some or all of the processing means, or the processing means may be external to the mobile units and the static stations, e.g. on one or more external servers. This may be advantageous since minimizing the processing power required on the mobile units can reduce their cost and can reduce power consumption, even after accounting for the need to transmit data from the mobile unit, which is especially useful when they are battery powered. The processing means may be split across multiple processors or multiple locations, or both. The receiver may be configured to transmit the received signal, or information derived therefrom, to remote processing means. A mobile unit or static station may comprise wired or wireless transmission means, such as a radio transmitter, for transmitting information relating to a received or transmitted signal.

A radio transmitter may be used to transmit timing information. In this way it can be possible to synchronize the transmitter and receiver such that time of arrival information can be used for positioning, rather than needing to use time difference of arrival, which is more complex and less robust.

Preferably the processing means is configured to use transmission and/or reception times to determine information relating to the distance between the mobile unit and the static station, and to use this distance information when determining the position of the mobile unit.

Preferably the receiver is configured to receive a plurality of said signals from different transmitters simultaneously or overlapping in time, and the processing means are configured to use the received signatures to identify the source transmitters and to use the identities of the source transmitters to determine information relating to the position of the mobile unit.

The processing means may use the signal strength and/or time of arrival and/or time difference of arrival information to determine information relating to the position of the mobile unit, for example by performing a trilateration calculation, familiar to those skilled in the art. Information relating to the position of the mobile unit may, for example, comprise an estimated position coordinate of the mobile unit relative to a fixed origin. The position information may relate to the position of the mobile unit in two or three dimensions.

Preferably the receiver is configured to receive the transmitted signal from along a plurality of paths, and the processing means are configured to use the time of transmission and times of reception (or just times of reception, in the case of differential calculations) to determine distance information for each of said paths. Typically one of the paths will be a direct-line path (although this may not always be the case) and the other paths will comprise one or more reflections off objects.

Because of the potential for motion-induced phase changes in the ultrasound signal, it is not practicable to mix a re-generated carrier signal with the received signal using a quadrature modulator, as would typically be done in synchronous processing of radio signals. Instead the processing means are preferably configured to cross-correlate the received signal with a reference copy of the pattern to determine a complex correlation signal, $Z(i)$, containing both in-phase and quadrature information.

Preferably the processing means is configured to determine the presence in the received signal of the second pattern, phase-shifted by 90 degrees from the first pattern and offset therefrom by a temporal offset. The processing means may be configured to compare the complex correlation signal $Z(i)$ with the same complex correlation signal shifted in time by an offset m, i.e. $Z(i+m)$. For convenience, this comparison will be referred to as a super correlation operation.

It will be appreciated that the real and imaginary parts of signals may be processed together or separately without affecting the result.

In some embodiments, the super correlation comprises determining the signed size of the exterior product of (i) the complex correlation signal with (ii) the complex correlation signal shifted in time by an offset m; i.e. $|Z(i) \wedge Z(i+m)|$. Such a super correlation operation has very low cross-correlation in cases where the offset does not equal the offset used by the transmitter, especially when even and odd offset values are compared (the offsets being expressed in terms of the chip length of the first pattern), and especially when the patterns are Barker codes. This operation can also be implemented efficiently, permitting the use of relatively simple hardware.

The processing means may be configured to perform a super correlation for each of a plurality of different time offsets m. These offsets may correspond to offsets used by all, or a subset of, the transmitters. The processing means may process the received signal to determine an offset at which the super correlation satisfies a match criterion. Preferably the match criterion is such that a match is found when the super correlation offset is the same as the offset between the transmitted patterns. For example, the match criterion may specify a match when the output of the super correlation is at a maximum, or is most strongly peaked, across a set of possible offsets. A match may be used to determine the identity of the source transmitter of the signal, by comparing the offset against the known respective offsets used by the transmitters.

The benefits of transmitting a signature specific to a transmitter, the signature comprising two out-of-phase, preferably overlapping, patterns can be applied more widely than a system in which the mobile units are receivers. In particular, such an approach can be employed advantageously in a system comprising static receivers and a mobile transmitter.

Thus, from a further aspect, the invention provides a system for determining the position of a mobile transmitter unit comprising: a plurality of mobile transmitter units each configured to transmit an ultrasonic signal comprising a phase-shifting signature specific to the transmitter unit, wherein each signature comprises a first pattern which is PSK-encoded on a first carrier signal and a second pattern which is PSK-encoded on a second carrier signal of the same frequency as the first carrier signal, but out of phase with the first carrier signal, wherein the second pattern is offset from the first pattern in time by a transmitter-specific offset; a static receiver station configured to receive an ultrasonic signal from one of the transmitter units; processing means configured to use the received signal to identify the source transmitter unit; and processing means configured to determine information relating to the position of the transmitter unit.

From another aspect, the provides a method of determining the position of a mobile transmitter unit comprising; transmitting a respective ultrasonic signal from each of a plurality of mobile transmitter units, each signal comprising a phase-shifting signature specific to the transmitter unit, wherein each signature comprises a first pattern which is PSK-encoded on a first carrier signal and a second pattern which is PSK-encoded on a second carrier signal of the same frequency as the first carrier signal, but out of phase with the first carrier signal, wherein the second pattern is offset from the first pattern in time by a transmitter-specific offset; receiving an ultrasonic signal from one of the transmitter units at a static receiver station; using the received signature to identify the source transmitter unit; and using the received signature to determine information relating to the position of the source transmitter unit.

From a further aspect, the invention provides a mobile transmitter unit configured to transmit an ultrasonic signal comprising a phase-shifting signature specific to the transmitter unit, wherein the signature comprises a first pattern which is PSK-encoded on a first carrier signal and a second pattern which is PSK-encoded on a second carrier signal of the same frequency as the first carrier signal, but out of phase with the first carrier signal, and wherein the second pattern is offset from the first pattern in time by an offset specific to the transmitter unit.

Optional features of the transmitters, receivers, mobile units and static units described previously, with reference to earlier aspects, may be optional features of mobile transmitter units and static receiver stations of embodiments of these aspects also.

The second carrier is preferably 90 degrees out of phase with the first carrier.

Some or all of the processing means may be in the static receiver station. Thus from a further aspect, the invention provides a static receiver station configured to receive from a transmitter unit an ultrasonic signal comprising a phase-shifting signature specific to the transmitter unit, wherein the signature comprises a first pattern which is PSK-encoded on a first carrier signal and a second pattern which is PSK-encoded on a second carrier signal of the same frequency as the first carrier signal, but out of phase with the first carrier signal, and wherein the second pattern is offset from the first pattern in time by an offset specific to the transmitter unit; and wherein the receiver station comprises processing means configured to use the received signal to identify the source transmitter unit, or comprises processing means configured to use the received signal to determine information relating to the position of the transmitter unit.

However, some or all of the processing means may be external to the receiver station; for example, at one or more remote servers.

In all of the foregoing aspects, each signature may comprise not just two but three patterns, e.g. three PSK-encoded patterns, which may be different patterns but are preferably the same (except for their relative phases) for a given signature. The same pattern is preferably used across all the transmitters, which simplifies the decoding. Within a signature, preferably a second pattern overlaps both a first pattern and a third pattern in time, but is out of phase with the first and third patterns, e.g. 90 degrees out of phase. The first and third patterns may be in phase, or 180 degrees out of phase. The third pattern preferably starts after the end of the first pattern; preferably immediately after the end of the first pattern.

Each signature may, for example, comprise a first QPSK-encoding of a Barker code of length L, a second QPSK-encoding of the Barker code at 90 degrees to the first code and offset from the first code by a first offset $n_1$, and a third QPSK-encoding of the Barker code at 90 degrees to the second code and offset from the second code by a second offset $n_2$. Preferably $n_1$ is less than L and preferably $n_2 = L - n_1$.

By having three (or more) patterns in the signature, it is possible to compensate for sub-peaks which may otherwise occur (at a distance from the main peak equal to the offset m) in the super correlation operation.

The number of possible different transmitter signatures may be increased by one or more of the transmitter signatures comprising one or more pauses. A pause may be present across all phases, or may occur on just one or more phases. In embodiments of the example given above, a chip pause of length p may be inserted between the first and last patterns, such that $n_2 = L - n_1 + p$.

Preferably the processing means are configured to evaluate an enhanced correlation function, which can be used when a signature comprises three Barker codes (which can be considered as comprising two pairs of Barker codes, where the pairs share one of the codes). The enhanced correlation function is a function of two super correlation operations using two different offset values. The values may, for example, correspond to the offset between the first and second patterns and the offset between the second and third patterns for one of the transmitter signatures. One of the super correlation operations may use an offset value equal to the length of the first pattern minus the offset value used by the other super correlation operation. For example, in some embodiments the processing means may determine the product of a super correlation at offset m with a super correlation at offset L−m, where L is the length of the first pattern in the transmitter signatures. In other embodiments, the enhanced correlation function may output the lower of the absolute magnitudes of the two super correlation operations.

When using minimum combining of the super correlations, a sign function may be evaluated separately to determine a sign for the output. The sign of a super correlation can be defined as +1 for a +90 degree phase difference and −1 for a −90 degree phase difference. The sign of the enhanced correlation can then be handled separately as a product of the signs of the super correlations (+1 or −1).

This enhanced correlation function may be evaluated for a plurality of different offsets m, which may comprise different offsets between the first and second patterns used in the signatures of a plurality of different transmitters. The identity of the source transmitter of the received signal may be determined by determining an offset value at which the enhanced correlation function satisfies a match criterion.

A particular advantage of embodiments of the present invention is that they can be implemented with low processing requirements. This makes it suitable for low-cost, battery-powered devices. In particular, the enhanced correlation function as described can be implemented using only a relatively limited number of processor operations.

The match criterion may comprise a three-point peak-finding algorithm evaluated across a range of offset values; e.g. a match may be recorded for an offset value at which the output of the enhanced correlation function is higher than for the immediately preceding and following offset values. A threshold minimum value may also be applied; e.g. for a match to be recorded, the offset value at which the output of the enhanced correlation function must also be higher than a predetermined minimum. The match criterion may also require the second derivative of the enhanced correlation function to satisfy a condition; this can provide even better separation of peaks from noise. For example, a match operation may determine the intersection of the first k largest peaks in output value of the enhanced correlation operation and the first k largest peaks in the second derivative of the output value, for a suitable value of k.

Multiple transmission paths (e.g. a direct path and a number of reflected paths) can be identified from the one or more peaks.

The transmission signal may comprise two copies of the transmitter signature. The patterns in one of the signatures may be of different phases from the corresponding patterns in the other signature; for example the whole of one signature may be offset from the other by 90 degrees. This can enable the two signatures easily to be distinguished from other, e.g. by considering the sign of the output of the enhanced correlation operation.

In embodiments in which the signature appears more than once in a transmission, a whole-transmission correlation operation may be performed which combines a plurality of enhanced correlation operations, e.g. through multiplication or absolute minimum combining.

Preferably at least one of the transmitter units or stations is further configured to transmit a signal comprising a phase-shifting ultrasonic message. Preferably the message is transmitted in the same transmission as the signature. If the signature is generated by modulating one or more carrier frequencies, the message is preferably transmitted by modulating one or more of the same carriers. The message and signature may both comprise a common Barker code. The message may follow the signature, preferably immediately thereafter to minimize the total length of the transmission.

Transmitting a phase-shifting signature and a message in a single communication allows the identity of the transmitter to be identified when decoding the message, as well as enabling correction of motion-induced phase changes in the message by applying appropriate correlation operations to the signature.

From a further aspect, the invention provides a method of transmitting information comprising: transmitting an ultrasound signal from a transmitter unit, the signal comprising (i) a signature comprising a first pattern which is PSK-encoded on a first carrier and a second pattern which is PSK-encoded on a second carrier, wherein the first and second carriers have the same frequency but wherein the second carrier is out of phase with first carrier, and wherein the second pattern is offset from the first pattern in time by a transmitter-specific offset, and (ii) a PSK-encoded message-bearing portion; receiving the signal at a receiver unit; using the first and second patterns in the received signal to characterize a motion-induced phase distortion in the received signal; using said characterization to compensate for motion-induced phase distortion in the received message-bearing portion; and decoding the message from the compensated signal.

From a further aspect, the invention provides a system for transmitting information comprising: a transmitter unit configured to transmit an ultrasound signal comprising (i) a signature comprising a first pattern which is PSK-encoded on a first carrier and a second pattern which is PSK-encoded on a second carrier, wherein the first and second carriers have the same frequency but wherein the second carrier is out of phase with first carrier, and wherein the second pattern is offset from the first pattern in time by a transmitter-specific offset, and (ii) a PSK-encoded message-bearing portion; a receiver unit configured to receive the ultrasound signal from the transmitter unit; and processing means configured: to use the first and second patterns in the received signal to characterize a motion-induced phase distortion in the received signal; to use said characterization to compensate for motion-induced phase distortion in the received message-bearing portion; and to decode the message from the compensated signal.

From another aspect, the invention provides a transmitter unit configured to transmit an ultrasound signal comprising (i) a signature comprising a first pattern which is PSK-encoded on a first carrier and a second pattern which is PSK-encoded on a second carrier, wherein the first and second carriers have the same frequency but wherein the second carrier is out of phase with first carrier, and wherein the second pattern is offset from the first pattern in time by a transmitter-specific offset, and (ii) a PSK-encoded message-bearing portion.

Some or all of the processing means may be in the receiver unit. Thus from a further aspect, the invention provides a receiver unit configured to receive from a transmitter unit an ultrasound signal comprising (i) a signature comprising a first pattern which is PSK-encoded on a first carrier and a second pattern which is PSK-encoded on a second carrier, wherein the first and second carriers have the same frequency but wherein the second carrier is out of phase with first carrier, and wherein the second pattern is offset from the first pattern in time by a transmitter-specific offset, and (ii) a PSK-encoded message-bearing portion, the receiver unit comprising processing means configured to use the first and second patterns in the received signal to characterize a motion-induced phase distortion in the received signal. The receiver unit may further be configured to use said characterization to compensate for motion-induced phase distortion in the received message-bearing portion and/or be configured to decode the message from the compensated signal.

However, some or all of the processing means may be external to the receiver unit; for example, in one or more external servers.

Optional features of the earlier aspects may be optional features of these aspects also. In particular, in some embodiments the signature comprises three PSK-encoded patterns, such as three identical Barker codes.

The second carrier is preferably 90 degrees out of phase with the first carrier.

In preferred embodiments of these aspects and foregoing aspects of the invention, the transmission signal may comprise two copies of the transmitter signature, one as a preamble to the message and the second as a post-amble to the message. The signature may also appear within the message.

Having a signature at the beginning and end of the transmission has been found to be advantageous due to the potentially very different signal conditions at these locations.

The message may be encoded using direct signal spread spectrum (DSSS); preferably using one or more Barker codes, which may comprise a Barker code which is the same as one which is used in the signature. For example, each message bit may be encoded as a 13-bit Barker code, with a 1 bit in the message being encoded as the 13 chips of the Barker code, and a 0 bit being encoded as the same 13 chips, but 180 degrees out of phase from those of the 1 bit. The use of the same spreading code for the signature as for a data portion of the message is particularly preferred since, for the short code lengths employed in preferred embodiments, no orthogonal codes exist. The use of the same code is therefore beneficial in order to obtain a good signal to noise ratio, e.g. in the presence of interference from echoes, transmissions from other devices, etc.

The message may be BPSK encoded or QPSK encoded, which have both been found to result in low error transmission; although any other suitable encoding may be used. The data may effectively be differentially encoded using the phases of the signature or signatures in the transmission as reference values.

The signature may be relatively short compared with the message. For example, the signature may be 26 chip-lengths long (i.e. two abutting 13-bit Barker codes), while an 8-bit message might be 104 chip-lengths long (i.e. eight 13-bit Barker codes). A signature that is short relative to a message means that most of the total channel capacity can be used for message information.

One or more phase reference element may be transmitted within the message. This can improve the decoding accuracy, especially for longer messages longer than 8 message bits). A phase reference element may be generated by including the message (before encoding) a data bit of known value at a known position. Alternatively, a phase reference element may comprise a known pattern (e.g. a Barker code) at a known position. The phase reference element may be transmitted at a phase offset from the encoded message; e.g. BPSK-encoded on a carrier which is at 90 degrees to a carrier on which the message is BPSK-encoded. When processing the received transmission, such phase reference elements can be used to compensate for motion-induced phase changes (Doppler shift) and/or to obtain a quality measure for a transmission path.

The message may be encoded using an error correcting code.

A time of flight of the signal from the transmitter to the receiver may be determined. A plurality of times of flight for the signal may be determined along different respective transmission paths.

A signal strength may be determined. A plurality of strengths of the signal along different respective transmission paths may be determined.

In some embodiments, a best-fit curve is fitted to phase information over time obtained from the received phase reference elements. This curve may be used to characterize a motion-induced phase distortion in the received signal.

The processing means may be configured to analyze phase information over time from the received signal to determine one or more of: relative phase offset, speed, velocity, and acceleration of the transmitter relative to the receiver.

A correlation coefficient may be determined for the best-fit curve, and may be used to determine a reliability measure for each of a set of transmission paths. The contributions to the received signal from different transmission paths may be combined using rake receiving in order to improve the signal-to-noise ratio for decoding the message accurately. The contribution from each path to a raking algorithm may be weighted according to the reliability measure for the path.

The transmitted signal may be received along a plurality of paths and the received signals may be rake combined, with the message being decoded from the raked combination.

The message may include information relating to the transmission time of the signal. This information may be used to determine information relating to the distance between the transmitter and the receiver.

In some embodiments, a carrier frequency used by a transmitter may be adjusted in response to interference. This adjustment may be automatic; i.e. the system may comprise processing means configured to determine the presence of interference at a particular frequency and to adjust the carrier frequency for a transmitter in response thereto. For example, the transmitter and receiver may be configured to PSK-encode and PSK-decode (respectively) at carrier frequencies of 38 kHz and 42 kHz. The ability to switch carrier frequencies can be particularly useful when the system is used in an indoors room, which can have regions of interference concentrated around a particular frequency.

Ultrasonic signals are acoustic signals having a frequency higher than the normal human hearing range; typically this means signals having a frequency greater than 20 kHz, e.g. between 30 and 100 kHz.

BRIEF DESCRIPTION OF THE DRAWINGS

Certain preferred embodiments of the invention will now be described, by way of example only, with reference to the accompanying drawings, in which.

DETAILED DESCRIPTION OF THE INVENTION

Figure 1:
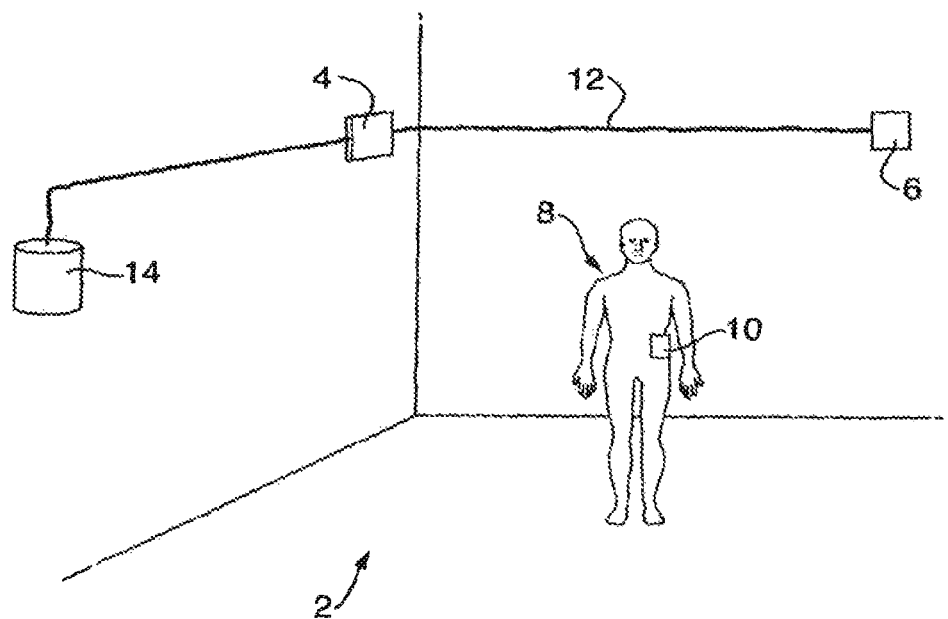
FIG. 1 is a perspective diagram of a positioning system embodying the invention.

FIG. 1 shows a room 2, to the walls of which are affixed a first static transmitter station 4 and a second static transmitter station 6. A person 8 in the room is carrying a mobile receiver unit 10. A network cable 12 connects the two transmitter stations 4, 6 to a server 14.

Figure 2:
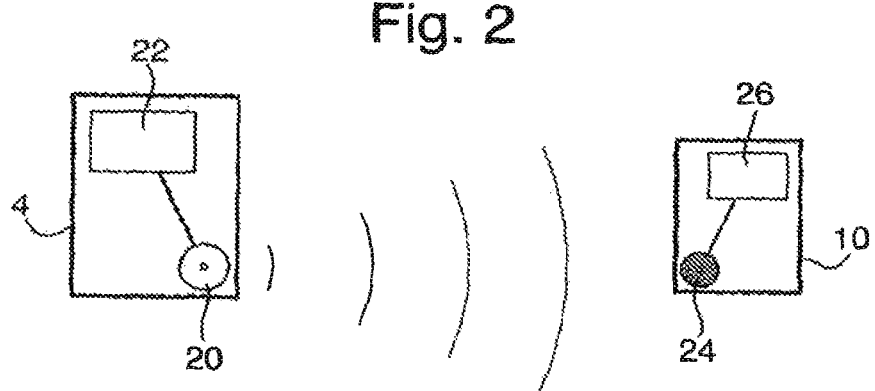
FIG. 2 is a figurative drawing of a static transmitter station and a mobile receiver nit.

FIG. 2 shows the first transmitter station 4, which has an ultrasonic sounder 20 and processing logic 22 for causing the ultrasound sounder 20 to transmit ultrasonic signals. The second transmitter station 6 has the same configuration. FIG. 2 also shows the mobile receiver unit 10, which has a microphone 24 capable of receiving ultrasonic signals from the transmitter station 4, and processing logic 26 for sampling and processing received signals.

In use, the server 14 causes each transmitter station 4, 6 to transmit, at intervals, a signature unique to that transmitter station. The server 14 may also instruct one or both transmitter stations 4, 6 to transmit information to the mobile receiver unit 10, such as an instruction for the mobile receiver unit 10 to inform the server 14 of the mobile unit's location (e.g. using a separate radio transmitter on the mobile unit).

Figure 3:
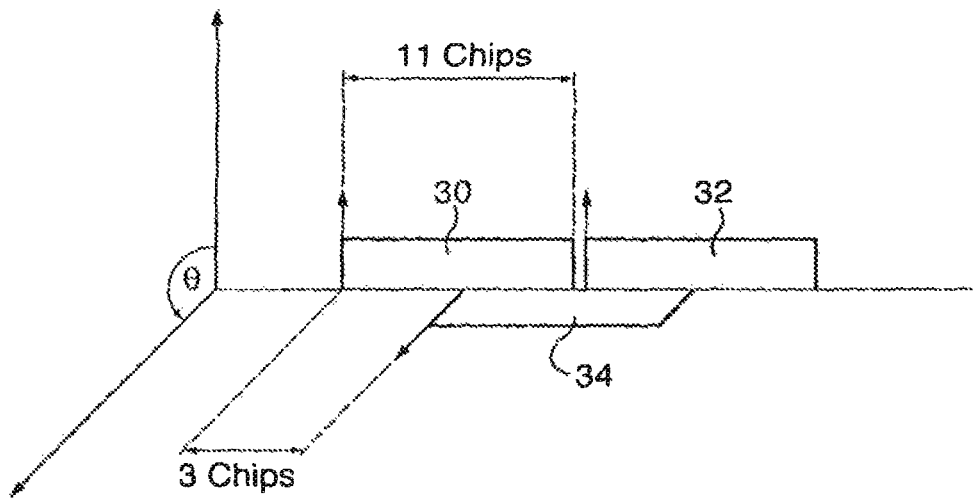
FIG. 3 is a phasor diagram of a signature transmitted by the static transmitter station.

FIG. 3 shows a signature unique to the transmitter station 4. The signature comprises two consecutive 11-bit Barker code "+1 +1 +1 −1 −1 −1 +1 −1 −1 +1 −1" BPSK modulated on a first 40 kHz carrier (which will be referred to as a first instance 30 and a third instance 32, for reasons which will become apparent). It also comprises another instance 34 of the same code (a second instance) modulated on a second 40 kHz carrier that has a 90 degree phase offset relative to the first carrier. This second instance 34 overlaps both the first instance 30 and the third instance 32 in time. The start of the second instance 34 is offset from the start of the first instance 30 by 3 chips (transmitted bits). This 3-chip offset is specific to the transmitter station 4.

The transmitter station 6 has a unique signature which is identical except for having an offset of 6 chips between the start of the second instance of the 11-bit Barker code and the start of the first instance of the code.

When the transmitter stations 4, 6 have no information to send, they may just transmit their respective signatures at intervals. These transmissions may be separated in time or may overlap.

The mobile receiver unit 10 performs correlation operations as described below on a received signal in order to determine the presence of a signature having a particular offset value between the first and second code instances. From this offset value the mobile unit 10 can determine the identity of the transmitter station that sent the received signal.

Moreover, the mobile receiver unit 10 may determine the presence of a plurality of instances of the same signature in the received signal, and may determine timing information relating to each instance, such as the time of arrival of each instance. From this timing information the mobile receiver unit 10 may determine the length of one or more signal paths between the static transmitter station 4 and the mobile receiver unit 10. It may use timing information relating to the shortest of these (typically the direct path), and optionally timing information relating to other indirect paths, to determine its position in the room, e.g. by combining such information in respect of three of more static transmitter stations in a spherical or ellipsoidal intersection calculation.

The mobile receiver unit 10 may not carry out all the processing using its own processing logic 26, but might share the processing with a remote computer such as the server 14, e.g. by transmitting relevant data to a remote device using ultrasound or radio.

Figure 4:
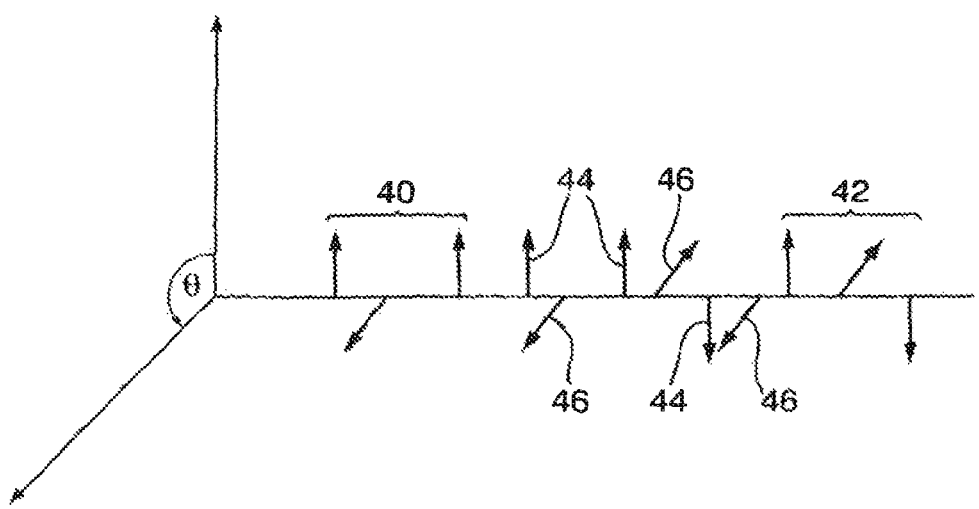
FIG. 4 is a phasor diagram of a message transmitted by the static transmitter station.

FIG. 4 shows a longer transmission from the transmitter station 4, which includes a 3-bit message. It starts with the signature 40 described with reference to FIG. 3. This is followed by the message bits 44 which are encoded using BPSK direct sequence spread spectrum (DSSS) with the same 11-bit Barker code as is used in the signature. This is followed by a modified signature 42 which uses the same timing offsets as the original signature 40, but has rotated the phase of the second and third instances of the Barker code by 180 degrees (thereby enabling it to be distinguished). Interleaved amongst the message bits 44 are phase reference bits 46. Each of these is an 11-bit BPSK encoded Barker code of known position and known, alternating phase.

All the Barker codes instances have a chip separation of 11 bits, except for the middle, second instance Barker codes transmitted as part of the pre- and post-ambles 40, 42, which are delayed by 3 chips with respect to the first instance Barker codes.

The chip rate is 4 KHz on a 40 kHz carrier. Thus each 11-bit Barker code has duration 2.75 ms. The system has a time resolution of less than 0.25 ms, which corresponds to 8.5 cm at the speed of sound in air. It is tolerant to Doppler shifts of up to around 10 m/s.

Considering the signature in FIG. 3, since the time elapsed between the first instance 30 and second instance 34 of the Barker codes is of the order of the chip duration, motion induced phase changes are relatively insignificant (the phase time resolution is of the order of the chip rate rather than the code rate). The relative phase change due to motion can therefore be considered to be negligible.

To identify this signature at the receiver end, both the time periodicity and phase correlation of the instances 30, 34 are imposed. The received signal is sent to an 11-bit Barker-code correlator which outputs a complex stream $Z_i$ of data. This is analyzed using the following algorithm:

$$Cor_{super}(Z_i, n) = r_i r_{i-n} \sin(\theta_i - \theta_{i-n})$$

which adopts polar notation $(r, \theta)$ of the complex values $Z_i$ and $Z_{i-n}$.

This expression is equivalent to the vector inner product of the correlator signal with an n sample shifted copy of it:

$$Cor_{super}(Z_i, n) = r_i r_{i-n} \sin(\theta_i - \theta_{i-n}) = Z_i \times Z_{i-n} = Re(Z_i) Im(Z_{i-n}) - Im(Z_i) Re(Z_{i-n})$$

This operation can be decomposed to two scalar multiplications of the real and imaginary parts of each signal plus a summation, and can therefore be easily performed using low complexity hardware.

The resulting "super correlation" has very low cross-correlation for different values of n, especially when even and uneven values are compared.

This super correlation function is susceptible to the occurrence of sub-peaks at distance n from the main peak. This is addressed by the third instance 32 of the Barker code in the signature. This results in three Barker codes at separations n and $L_s − n$.

By taking the product of the super correlations 30-34 and 34-32, or the absolute minimum magnitude of 30-34 and 34-32, an enhanced correlation function, referred to in these equations as a "super-duper correlation", can be obtained which has near perfect cross-correlation behavior:

$$\text{Super\_Duper\_Cor}_{super}(Z_i, n) = \text{MIN}[\text{ABS}\{Cor_{super}(Z_i, n)\}, \text{ABS}\{Cor_{super}(Z_i, L_s - n)\}]$$

The sign of the super-duper correlation can be processed separately.

The signature can be repeated in the data transmission to enhance the signal-to-noise ratio. The overall correlation of the repeated signatures can be obtained through multiplication or absolute minimum combining.

Once the overall super-duper correlation has been identified, the multiple paths can be easily identified using peak analysis. Due to the availability of sign in the super-duper correlation a distinction can be made between the effective phase sign of a pre-amble 40 and post-amble 42. Peak finding using a simple three point peak finding algorithm with thresholding (A) can be used for the initial identification of paths:

$$x_{t-1} > x_{t-2} \wedge x_{t-1} > A \wedge x_{t-1} > x_t$$

If required the second derivative of the super-duper correlation can be used in addition to achieve even better separation of peaks from noise. A good way to combine both signal and second derivative peaks is to take the cross-section of the first n largest peaks resulting from both signal and its second derivative.

Data bits are transmitted between the pre- and post-ambles using single Barker codes with discrete phase shifts. In principle any number of discrete phase shifts to encode data used can be used. However both binary (2 phase shifts, BPSK) and Quadrature (4 phase shifts; QPSK) Phase Shift Keying result in effective low error transmission. The message data are effectively differentially encoded using the phases of the pre- and post-amble as reference values.

For longer data transmissions (e.g. >8 bits) it can be advantageous to include additional phase reference values in the transmission to ensure the quality of the transmission. Phase reference values are effectively data bits with known bit values at known positions in the transmission. These can be used for two purposes: (i) to compensate the phase reference levels for motion induced phase changes (Doppler), and (ii) to obtain an error measure of the motion corrected phase references for each transmission path, which is then used to weight the contribution of each path in rake combining and data recovery.

Once all paths have been identified in terms of time-of-arrival, amplitude, phase and Doppler, corrected data values can be obtained for an inertial frame where there is no relative velocity between transmitter and receiver. The data values resulting from the different paths can now be combined to ensure higher reception reliability. The combining can be improved by weighting each path with a factor that scales with its error probability.

Decoding of the data message after rake combining comprises evaluating the data value for closeness to the phase constellation points used in the phase keying scheme.

It has been shown that a number of different signatures consisting of three Barker chirps can be transmitted with different relative phases and time offsets. With 11-bit Barker codes with offsets of 1, 2, 3, 4 and 5 for the middle Barker instance and for five respective transmitters, these signals can be shown to be almost orthogonal and can therefore be easily separated at the receiver. This means that these signals can be transmitted simultaneous or nearly simultaneous, whilst a receiver will be able to identify and characterize (in terms of time-of-arrival, amplitude, phase and Doppler) all existing paths between transmitter and receiver, including reflections. The number of orthogonal combinations can be extended through the use of different number of Barker codes, time offsets and phases.

It will be appreciated that the same principles can be applied to a mobile transmitter unit, which may be carried by the person 8, and which transmits a transmission such as that in FIG. 4. This transmission can be received at a number of station receiver stations which can decode the message information and which can also determine time-of-arrival information from the signature, potentially for direct and indirect paths. This timing information may be combined with knowledge of the locations of the static stations to determine a position estimate for the mobile unit.

A feature of one embodiment or aspect may be used in another embodiment or aspect wherever appropriate. Method steps may be carried out in any order wherever appropriate, and may be implemented in one processor or unit or may be distributed across multiple processors or units. Steps may be implemented in software or hardware or a combination of both.

What is claimed is:

1. A system for transmitting information comprising:
a transmitter unit configured to transmit an ultrasound signal comprising (i) a signature comprising a first pattern which is PSK-encoded on a first carrier and a second pattern which is PSK-encoded on a second carrier, wherein the first and second carriers have the same frequency but wherein the second carrier is out of phase with first carrier, and wherein the second pattern is offset from the first pattern in time by a transmitter-specific offset, and (ii) a PSK-encoded message-bearing portion;
a receiver unit configured to receive the ultrasound signal from the transmitter unit; and
a processing subsystem configured:
to use the first and second patterns in the received signal to characterise a motion-induced phase distortion in the received signal;
to use said characterisation to compensate for motion-induced phase distortion in the message-bearing portion of the received signal, thereby generating a compensated signal; and
to decode the message from the compensated signal.

2. The system as claimed in claim 1, wherein the second carrier is 90 degrees out of phase with the first carrier.

3. The system as claimed in claim 1, wherein the signature comprises three PSK encoded identical Barker codes.

4. The system as claimed in claim 3, wherein the message is encoded by direct signal spread spectrum (DSSS) using said Barker code.

5. The system as claimed in claim 1, wherein the transmitter unit is configured to transmit one or more phase reference elements within the message.

6. The system as claimed in claim 1, wherein the processing subsystem is configured to analyse phase information over time from the received signal to determine one or more of: relative phase offset, speed, velocity, and acceleration of the transmitter relative to the receiver.

7. The system as claimed in claim 1, wherein the processing subsystem is further configured to rake combine the transmitted signal, received along a plurality of paths, and to decode the message from the raked combination.

8. The system as claimed in claim 1, wherein the message includes information relating to the transmission time of the signal and wherein the processing subsystem is configured to use said information to determine information relating to the distance between the transmitter unit and the receiver unit.

9. The system as claimed in claim 1, wherein the transmitter unit is configured to transmit the signal at a carrier frequency, and wherein the system is configured to determine the presence of interference at a particular frequency and to adjust the carrier frequency for the transmitter in response.

10. A method of transmitting information comprising:
transmitting an ultrasound signal from a transmitter unit, the signal comprising (i) a signature comprising a first pattern which is PSK-encoded on a first carrier and a second pattern which is PSK-encoded on a second carrier, wherein the first and second carriers have the same frequency but wherein the second carrier is out of phase with first carrier, and wherein the second pattern is offset from the first pattern in time by a transmitter-specific offset, and (ii) a PSK-encoded message-bearing portion;

receiving the signal at a receiver unit;

using the first and second patterns in the received signal to characterise a motion-induced phase distortion in the received signal;

using said characterisation to compensate for motion-induced phase distortion in the message-bearing portion of the received signal; and decoding the message from the compensated signal.

11. A receiver unit configured to receive from a transmitter unit an ultrasound signal comprising (i) a signature comprising a first pattern which is PSK-encoded on a first carrier and a second pattern which is PSK-encoded on a second carrier, wherein the first and second carriers have the same frequency but wherein the second carrier is out of phase with first carrier, and wherein the second pattern is offset from the first pattern in time by a transmitter-specific offset, and (ii) a PSK-encoded message-bearing portion, the receiver unit comprising a processing system configured to use the first and second patterns in the received signal to characterise a motion-induced phase distortion in the received signal, wherein the processing system is further configured to use said characterisation to compensate for motion-induced phase distortion in the message-bearing portion of the received signal.

12. The receiver unit as claimed in claim 11, wherein the processing system is further configured to decode the message from the compensated signal.

* * * * *